(12) United States Patent
Lin et al.

(10) Patent No.: US 11,017,557 B2
(45) Date of Patent: May 25, 2021

(54) DETECTION METHOD AND DEVICE THEREOF (71) Applicant: ARCSOFT CORPORATION LIMITED, Hangzhou (CN)

(72) Inventors: Chung-Yang Lin, Hangzhou (CN); Pu Zhang, Hangzhou (CN); Wei Zhou, Hangzhou (CN)

(73) Assignee: ARCSOFT CORPORATION LIMITED, Hangzhou (CN)

( * ) Notice: Subject to any disclaimer, the term of this patent is extended or adjusted under 35 U.S.C. 154(b) by 53 days.

(21) Appl. No.: 16/171,369

(22) Filed: Oct. 26, 2018

(65) Prior Publication Data

US 2019/0130600 A1 May 2, 2019

(30) Foreign Application Priority Data

Oct. 27, 2017 (CN) .......................... 201711024466.5

(51) Int. Cl.
*G06K 9/00* (2006.01)
*G06T 7/73* (2017.01)

(52) U.S. Cl.
CPC ............ *G06T 7/74* (2017.01); *G06K 9/00221* (2013.01); *G06T 7/73* (2017.01); *G06T 7/75* (2017.01);
(Continued)

(58) Field of Classification Search
CPC ........... G06K 9/00228; G06K 9/00234; G06K 9/00248; G06K 9/00255; G06K 9/00261; G06K 9/00268; G06K 9/00275; G06K 9/00281; G06K 9/00288; G06K 9/00295; G06K 9/00302; G06K 9/00308; G06K 9/00315; G06K 2009/00322; G06K 2009/00328; G06K 9/00335; G06K 9/0061; G06K 9/627; G06K 9/00221; G06K 9/4628; G06T 7/74; G06T 7/75; G06T 7/73; G06T 2207/10016; G06T 2207/30201; G06T 2207/20084
(Continued)

(56) References Cited

U.S. PATENT DOCUMENTS

2004/0240711 A1* 12/2004 Hamza ............... G06K 9/00288
382/118
2010/0189358 A1* 7/2010 Kaneda ............. G06K 9/00744
382/195

FOREIGN PATENT DOCUMENTS

CN 102610035 A 7/2012
CN 102830793 A 12/2012
(Continued)

*Primary Examiner* — Huy C Ho
(74) *Attorney, Agent, or Firm* — Bayramoglu Law Offices LLC (57) ABSTRACT

The present invention provides a detection method and a detection device, which are applied in the field of image processing. The detection method includes: receiving a first image, wherein the first image includes at least one face; performing at least one of the following processing on the first image: detecting a left eye and/or a right eye of the face in the first image, estimating a position of the face relative to a camera device, and estimating an attitude of the face; and inputting the results of the processing into a first neural network to determine a line-of-sight of the face. The detection method and the detection device provided by the present invention enable a terminal to detect the line-of-sight of a user and/or other person.

24 Claims, 8 Drawing Sheets

(52) U.S. Cl.
CPC ............... *G06T 2207/10016* (2013.01); *G06T 2207/20084* (2013.01); *G06T 2207/30201* (2013.01)

(58) Field of Classification Search
USPC .......................................................... 382/103
See application file for complete search history.

(56) References Cited

FOREIGN PATENT DOCUMENTS

| | | | |
|---|---|---|---|
| CN | 103218579 | A | 7/2013 |
| CN | 104978548 | A | 10/2015 |
| CN | 105426827 | A | 3/2016 |
| CN | 105827820 | A | 8/2016 |
| CN | 107122705 | A | 9/2017 |
| CN | 107194288 | A | 9/2017 |

* cited by examiner

DETECTION METHOD AND DEVICE THEREOF

CROSS REFERENCE TO RELATED APPLICATIONS

This application is based upon and claims priority to Chinese Patent Application No. CN201711024466.5, filed on Oct. 27, 2017, the entire contents of which are incorporated herein by reference.

TECHNICAL FIELD

The present invention relates to a method and a device for image processing, and particularly to a detection method and a device thereof.

BACKGROUND

At present, various terminal devices are emerging one after another, and there is an increasing interest in user's usage and experience.

The lack of methods and devices for terminal detection of the line-of-sight of a user and/or other person exists in the prior.

SUMMARY

The present invention provides a detection method and a device thereof, which can solve the problem of lacking methods and devices for detecting the line-of-sight of a user and/or other person by using a terminal.

A first aspect of the present invention provides a detection method, the method includes: receiving a first image, wherein the first image includes at least one face; performing at least one of the following processing on the first image: detecting a left eye and/or a right eye of the face in the first image, estimating a position of the face relative to a camera device, and estimating an attitude of the face; and inputting the results of the processing into a first neural network to determine a line-of-sight of the face.

According to the first aspect of the present invention, in a first executable mode of the first aspect of the present invention, the method further includes: determining a viewpoint of the face according to the line-of-sight of the face; triggering an operation of the terminal according to a position of the viewpoint of the face relative to the terminal screen.

According to the first executable mode of the first aspect of the present invention, in a second executable mode of the first aspect of the present invention, the triggering the operation of the terminal according to the position of the viewpoint of the face relative to the terminal screen includes: determining a viewpoint of a face of someone other than the user located on the terminal screen, and performing a terminal alarm.

According to the first executable mode of the first aspect of the present invention or the second executable mode of the first aspect of the present invention, in a third executable mode of the first aspect of the present invention, determining the viewpoint of the face according to the line-of-sight of the face includes: determining the viewpoint of the face according to the line-of-sight of the face, the position of the left eye and/or the right eye of the face, and the positional relationship between the camera device and the terminal screen.

According to the third executable mode of the first aspect of the present invention, in a fourth executable mode of the first aspect of the present invention, the position of the left eye and/or the right eye of the face includes: a position of a center point of the left eye and/or the right eye of the face, wherein the position of the center point of the left eye and/or the right eye of the face is calculated from the positions of the points of the corners of the eye of the left eye and/or the right eye of the face.

According to the fourth executable mode of the first aspect of the present invention, in a fifth executable mode of the first aspect of the present invention, the positions of the points of the corners of the eye are obtained by fitting according to the first image and the face database.

According to the first aspect of the present invention or any one of the first executable mode to the fifth executable mode of the first aspect of the present invention, in a sixth executable mode of the first aspect of the present invention, detecting the left eye and/or the right eye of the face in the first image includes: determining an image including the left eye and/or the right eye in the first image.

According to the first aspect of the present invention or any executable mode of the first executable mode to the sixth executable mode of the first aspect of the present invention, in a seventh executable mode of the first aspect of the present invention, estimating the position of the face relative to the camera device includes: detecting feature points of the face according to the first image, determining a circumscribed rectangle including the feature points of the face; and normalizing and binarizing the circumscribed rectangle and the first image into a second image.

According to the first aspect of the present invention or any one of the first executable mode to the seventh executable mode of the first aspect of the present invention, in an eighth executable mode of the first aspect of the present invention, estimating the attitude of the face includes: detecting coordinates of the two-dimensional feature points and three-dimensional feature points of the face according to the first image and the face database; estimating the attitude of the face according to the internal parameters of the camera device for shooting the first image, and the two-dimensional feature points and three-dimensional feature points of the face.

According to the eighth executable mode of the first aspect of the present invention, in a ninth executable mode of the first aspect of the present invention, the attitude of the face is represented by a rotation matrix.

According to the first aspect of the present invention or any executable mode of the first executable mode to the ninth executable mode of the first aspect of the present invention, in a tenth executable mode of the first aspect of the present invention, inputting the results of the processing into the first neural network includes at least one of the following: inputting a result of detecting the left eye of the face in the first image into a first convolutional layer of the first neural network, and/or, inputting a result of detecting the right eye of the face in the first image into a second convolutional layer of the first neural network; inputting a result of estimating the position of the face relative to the camera device into a first fully connected layer of the first neural network; inputting a result of estimating the attitude of the face into the first neural network.

According to the tenth executable mode of the first aspect of the present invention, in an eleventh executable mode of the first aspect of the present invention, the first neural network includes: outputs of the first convolutional layer and the second convolutional layer are inputs of a second fully connected layer; an output of the first fully connected layer is an input of a third fully connected layer; outputs of the second fully connected layer and the third fully connected layer are inputs of a fourth fully connected layer; the result of estimating the attitude of the face and the output of the fourth fully connected layer are inputs of the results of the line-of-sight of the face.

A second aspect of the present invention provides a detection device, the device includes: a first receiver configured to receive a first image, wherein the first image includes at least one face; a first processor configured to perform at least one of the following processing on the first image: detecting a left eye and/or a right eye of the face in the first image, estimating a position of the face relative to the camera device, and estimating an attitude of the face; and a line-of-sight determination processor configured to input the results of the processing into a first neural network to determine the line-of-sight of the face.

According to the second aspect of the present invention, in a first executable mode of the second aspect of the present invention, the first processor is further configured to determine a viewpoint of the face according to the line-of-sight of the face, and to trigger an operation of the terminal according to a position of the viewpoint of the face relative to the terminal screen.

According to the second aspect of the present invention, in a second executable mode of the second aspect of the present invention, the first processor is specifically configured to determine that a viewpoint of a face of someone other than the user is located on the terminal screen, and to perform a terminal alarm.

According to the first executable mode or the second executable mode of the second aspect of the present invention, in a third executable mode of the second aspect of the present invention, the first processor is specifically configured to determine the viewpoint of the face according to the line-of-sight of the face, the position of the left eye and/or the right eye of the face, and the positional relationship between the camera device and the terminal screen.

According to the third executable mode of the second aspect of the present invention, in a fourth executable mode of the second aspect of the present invention, the position of the left eye and/or the right eye of the face includes: a position of a center point of the left eye and/or the right eye of the face, wherein the position of the center point of the left eye and/or the right eye of the face is calculated from the positions of the points of the corners of the eye of the left eye and/or the right eye of the face.

According to the fourth executable mode of the second aspect of the present invention, in a fifth executable mode of the second aspect of the present invention, the position of the points of corners of eye are obtained by fitting according to the first image and the face database.

According to the second aspect of the present invention or any one of the first executable mode to the fifth executable mode of the second aspect of the present invention, in a sixth executable mode of the second aspect of the present invention, the first processor is specifically configured to determine an image including the left eye and/or the right eye in the first image.

According to the second aspect of the present invention or any one of the first executable mode to the sixth executable mode of the second aspect of the present invention, in a seventh executable mode of the second aspect of the present invention, the first processor is specifically configured to detect feature points of the face according to the first image, to determine a circumscribed rectangle including the feature points of the face; and to normalize and binarize the circumscribed rectangle and the first image into a second image.

According to the second aspect of the present invention or any one of the first executable mode to the seventh executable mode of the second aspect of the present invention, in an eighth executable mode of the second aspect of the present invention, the first processor is specifically configured to detect coordinates of the two-dimensional feature points and three-dimensional feature points of the face according to the first image and the face database, and to estimate the attitude of the face according to the internal parameters of the camera device for shooting the first image, and the two-dimensional feature points and three-dimensional feature points of the face.

According to the eighth executable mode of the second aspect of the present invention, in a ninth executable mode of the second aspect of the present invention, the attitude of the face is represented by a rotation matrix.

According to the second aspect of the present invention or any one of the first executable mode to the ninth executable mode of the second aspect of the present invention, in a tenth executable mode of the second aspect of the present invention, the line-of-sight determination processor is specifically configured to: input a result of detecting the left eye of the face in the first image into a first convolutional layer of the first neural network, and/or, input a result of detecting the right eye of the face in the first image into a second convolutional layer of the first neural network; input a result of estimating the position of the face relative to the camera device into a first fully connected layer of the first neural network; and input a result of estimating the attitude of the face into the first neural network.

According to the tenth executable mode of the second aspect of the present invention, in an eleventh executable mode of the second aspect of the present invention, the first neural network includes: outputs of the first convolutional layer and the second convolutional layer are inputs of a second fully connected layer; an output of the first fully connected layer is an input of a third fully connected layer; outputs of the second fully connected layer and the third fully connected layer are inputs of a fourth fully connected layer; the result of estimating the attitude of the face and the output of the fourth fully connected layer are inputs of the results of the line-of-sight of the face.

The detection method and the detection device provided by the present invention enable a terminal to detect a line-of-sight of a user and/or other person.

DETAILED DESCRIPTION OF THE EMBODIMENTS

The technical solutions in the embodiments of the present invention will be described in detail below with reference to the drawings in the embodiments of the present invention.

The terms "first", "second", etc., in the above-described drawings in the specification and claims of the present invention are used to distinguish different objects, and are not intended to limit a specific order.

The term "and/or" in the embodiments of the present invention is merely an association relationship describing the associated objects, indicating that there can be three relationships, for example, A and/or B may indicate that there are three cases in which A exists alone, A and B exist simultaneously, and B exists alone.

In the embodiments of the present invention, the words "exemplarily" or "for example" are used to indicate an example, an illustration, or a description. Any embodiment or technical solution described as "exemplarily" or "for example" in the embodiments of the present invention should not be construed as preferred or advantageous over other embodiments or technical solutions. Rather, the use of the words "exemplarily" or "for example" is intended to present relevant concepts in a specific manner.

It should be noted that, for the sake of brevity and clarity of the drawings, the components shown in the drawings are not necessarily drawn to scale. For example, the sizes of some components can be increased relative to other components for clarity. Further, where considered appropriate, reference numerals can be repeated among the drawings to indicate corresponding or similar components.

Figure 1:
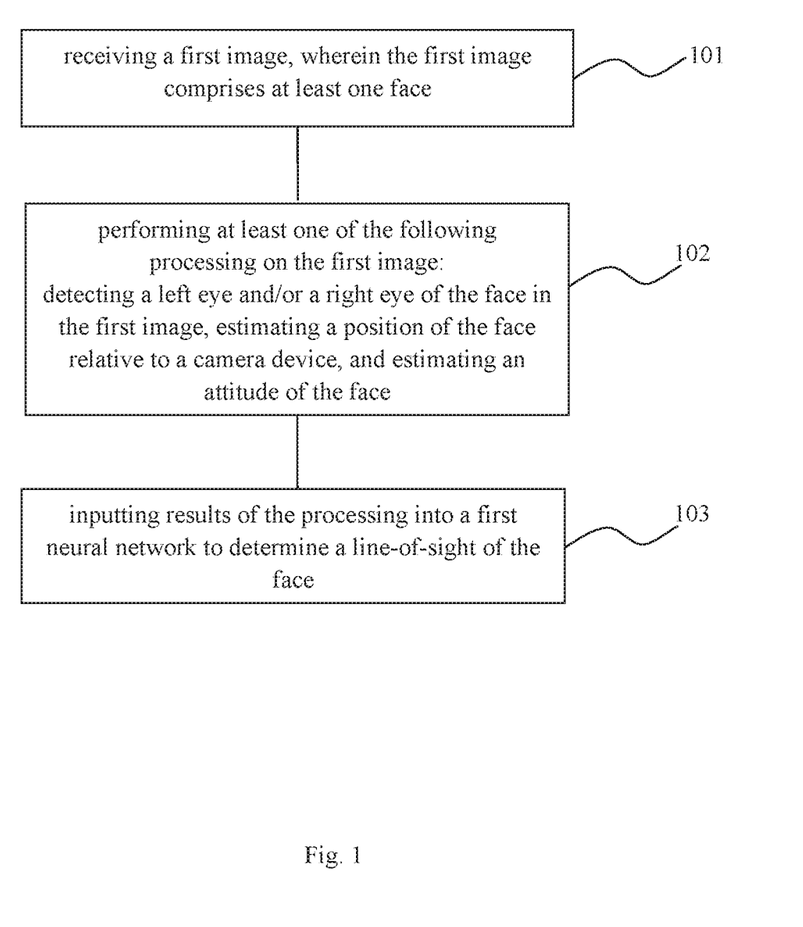
FIG. 1 is a flowchart of a detection method according to Embodiment One of the present invention.

A detection method provided by Embodiment One of the present invention will be described in detail below with reference to FIG. 1. As shown in FIG. 1, the method includes the following steps.

Step 101: a first image is received, wherein the first image includes at least a face.

Optionally, the above-described receiving the first image may be achieved by receiving from a memory storing the first image, and the memory may be a Read-Only Memory (ROM), a random access memory (RAM), or a flash memory. The first image can be a color image such as a red green blue (RGB) image or a black-and-white image. The first image can be captured by a camera of the terminal.

Step 102: at least one of the following processing is performed on the first image: detecting a left eye and/or a right eye of the face in the first image, estimating a position of the face relative to a camera device, and estimating the attitude of the face.

Optionally, the order of execution of the above-described three actions, i.e. detecting the left eye and/or the right eye of the face in the first image, estimating the position of the face relative to the camera device, and estimating the attitude of the face, is not limited, and the three actions may be performed in parallel or in other orders.

Step 103: results of the processing are inputted into a first neural network to determine a line-of-sight of the face.

The method further includes: determining a viewpoint of the face according to the line-of-sight of the face, and triggering an operation of the terminal according to a position of the viewpoint of the face relative to the terminal screen. Triggering the operation of the terminal according to the position of the viewpoint of the face relative to the terminal screen includes: determining a viewpoint of a face of someone other than the user located on the terminal screen, and performing a terminal alarm. Specifically, the foregoing alarm may include popping up of a message box with prompt information, appearing of a message box with prompt information from one side of the terminal, or an alarm in the form of vibration or sound, etc. Optionally, the above-described triggering the operation of the terminal may further include triggering an application, for example, triggering a camera or video mode of the terminal to start, or triggering a front camera of the terminal to work. In this way, the line-of-sight of the surrounding person is acquired though the camera of the terminal, and when it is found that the line-of-sight of another person locates on the terminal screen, the above-mentioned alarm can be performed to prevent others from peeking at the user's information.

Optionally, detecting the left eye and/or the right eye of the face in the first image includes: determining an image including the left eye and/or the right eye in the first image. Optionally, the above-described image including the left eye and/or the right eye may be a small rectangular image including the left eye and/or the right eye.

Figure 2:
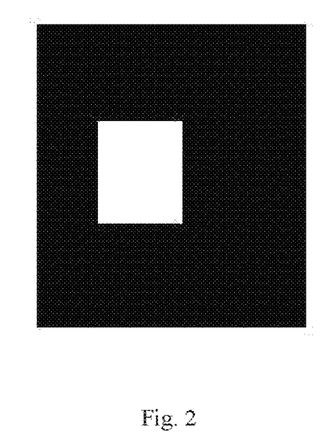
FIG. 2 is a schematic diagram of a position of a face relative to a camera device according to Embodiment One of the present invention.

Optionally, estimating the position of the face relative to the camera device includes: detecting feature points of the face according to the first image, determining a circumscribed rectangle including the feature points of the face; and normalizing and binarizing the circumscribed rectangle and the first image into a second image. Optionally, a location of two-dimensional feature point of the face in the first image can be demarcated by using a face database, such as a 3D Morphable Models (3DMM) database; and the first image including the circumscribed rectangle is normalized to a size of 25×25, and then binarized, such as a face area of 1 (white portion), and the remaining area of 0 (black portion), as shown in FIG. 2. Optionally, the above-described circumscribed rectangle may be an approximately circumscribed rectangle, that is, the edge of the circumscribed rectangle is close to the feature points of the face.

Optionally, estimating the attitude of the face includes: detecting coordinates of the two-dimensional feature points and three-dimensional feature points of the face according to the first image and the face database; estimating the attitude of the face according to the internal parameters of the camera device for shooting the first image, and the two-dimensional feature points and three-dimensional feature points of the face. The camera device can be on the terminal, such as the front camera of a mobile phone. Specifically, the two-dimensional coordinates and the three-dimensional coordinates of the feature points of the face may be estimated according to the 3DMM database and the first image. The above-described feature points of the face include: feature points of the eye, feature points of the nose, feature points of the mouth, feature points of the eyebrows, etc. The internal parameters of the camera device for shooting the first image can be estimated by the following method:

$$C_x = w/2;$$
$$C_y = h/2;$$
$$f_x = 500 * \left(\frac{w}{640}\right);$$

-continued $$f_y = 500 * \left(\frac{h}{480}\right);$$

wherein, the $C_x$ and the $C_y$ are coordinates of main points, w and h are the width and the height of the first image, respectively, and $f_x$ and $f_y$ are the projections of the focal length in the x-axis direction and in the y-axis direction, respectively. According to the obtained coordinates of the two-dimensional points and the three-dimensional points, the pose of the camera device can be estimated as $M=f(C_x, C_y, f_x, f_y, P_{2D}, P_{3D})$, $M=[R, T]$, wherein, R is a rotation matrix, T is a translation matrix, and the attitude of the face can be represented by the rotation matrix.

Optionally, determining the viewpoint of the face according to the line-of-sight of the face includes: determining the viewpoint of the face according to the line-of-sight of the face, the position of the left eye and/or the right eye of the face, and the positional relationship between the camera device and the terminal screen. The position of the left eye and/or the right eye of the face includes: a position of a center point of the left eye and/or the right eye of the face, wherein the position of the center point of the left eye and/or the right eye of the face is calculated from the positions of the points of the corners of the eye of the left eye and/or the right eye of the face. The positions of the points of the corners of the eye are obtained by fitting according to the first image and the face database. The face database can be the above-described 3DMM database.

Specifically, the position of the left eye and/or the right eye of the face may be represented by the position of the obtained feature points of the eye as described above, or may be represented by the center point of the left eye and/or the right eye. The following is the method to obtain the coordinates of the center point:

$$P_{cl} = \frac{R(P_{3D}^{21} + P_{3D}^{27})}{2} + T;$$

$$P_{cr} = \frac{R(P_{3D}^{33} + P_{3D}^{39})}{2} + T;$$

wherein, $P_{3D}^{21}$, $P_{3D}^{27}$, $P_{3D}^{33}$, $P_{3D}^{39}$ are the three-dimensional coordinates of four points of the corners of the eyes, $P_{cl}$ is the coordinate of the center point of the left eye, $P_{cr}$ is the coordinate of the center point of the right eye.

Inputting the results of the processing into the first neural network includes at least one of the following: inputting a result of detecting the left eye of the face in the first image into a first convolutional layer of the first neural network, and/or, inputting a result of detecting the right eye of the face in the first image into a second convolutional layer of the first neural network; inputting a result of estimating the position of the face relative to the camera device into a first fully connected layer of the first neural network; inputting a result of estimating the attitude of the face into the first neural network. Outputs of the first convolutional layer and the second convolutional layer are inputs of a second fully connected layer; an output of the first fully connected layer is an input of a third fully connected layer; outputs of the second fully connected layer and the third fully connected layer are inputs of a fourth fully connected layer; the result of estimating the attitude of the face and the output of the fourth fully connected layer are inputs of the results of the line-of-sight of the face. Specifically, FIG. 3 exemplarily shows a structure of a first neural network that can be applied to the present invention. Exemplarily, the dimension of the above-mentioned first fully connected layer is 256, the dimension of the second fully connected layer is 128, the dimension of the third fully connected layer is 128, and the dimension of the fourth fully connected layer is 128. In FIG. 2, the size of the image representing the position of the face relative to the camera device is 25*25. The convolutional layer described above may include three sub-layers having sizes of 5*5/32, 3*3/32 and 3*3/64, respectively.

Figure 3:
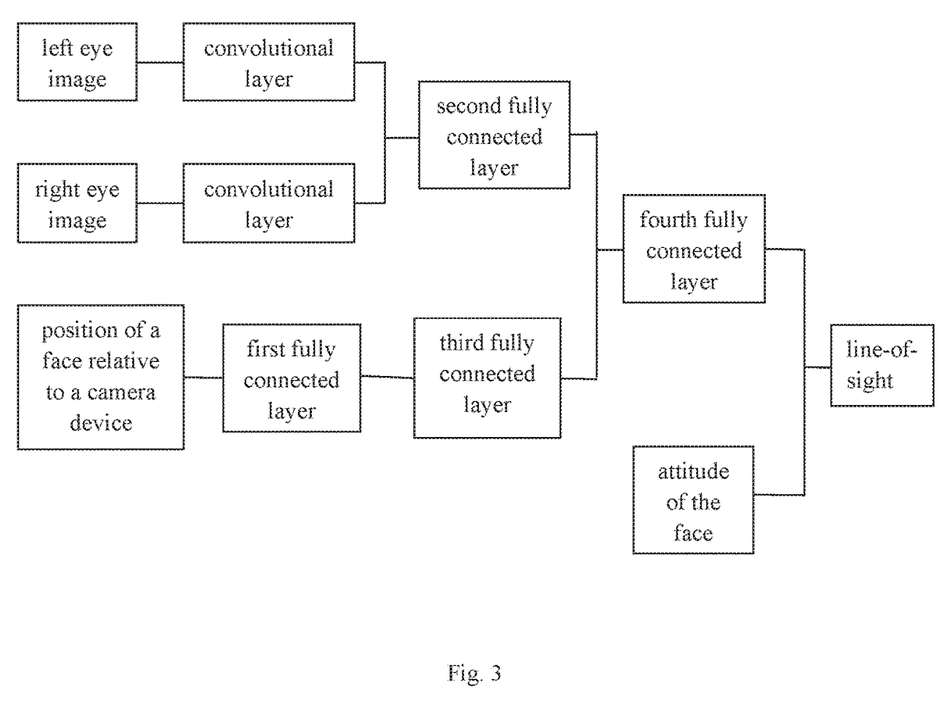
FIG. 3 is a schematic diagram of a neural network structure according to Embodiment One of the present invention.

Through the first neural network described above, the line-of-sights of the left eye and the right eye can be obtained as $V_1$ and $V_2$, respectively, and the coordinates of the fixation points of the eye can be obtained by the following method:

$$P_{sl}=P_{cl}+d_1 V_1;$$

$$P_{sr}=P_{cr}+d_2 V_2;$$

wherein, $P_{sl}$ is the fixation point of the left eye, $P_{sr}$ is the fixation point of the right eye, $d_1$, $d_2$ are the coefficients. Therefore, $$\begin{pmatrix} x_{sl} \\ y_{sl} \\ z_{sl} \end{pmatrix} = \begin{pmatrix} x_{cl} \\ y_{cl} \\ z_{cl} \end{pmatrix} + d_1 \begin{pmatrix} x_{v1} \\ y_{v1} \\ z_{v1} \end{pmatrix},$$

wherein, $(x_{sl}, y_{sl}, z_{sl})$ is the coordinate of $P_{sl}$, $(x_{cl}, y_{cl}, z_{cl})$ is the coordinate of $P_{cl}$, $(x_{v1}, y_{v1}, z_{v1})$ is the coordinate of $V_1$.

Optionally, on a tablet and a mobile device, the camera device is on the same plane as the screen, that is, the point on the screen in the camera coordinates is z (depth value)=0, so:

$$z_{sl}=z_{cl}+d_1 z_{v1}$$

$$d_1=z_{cl}/z_{v1};$$

similarly, $$d_2=z_{cr}/z_{v2};$$

so, the fixation point $P_{sc}=(P_{sr}+P_{sl})/2$.

The above-mentioned first neural network can be pre-trained according to the foregoing structure and function, and stored in the terminal. After the first image is captured by the front camera device, the position of the line-of-sight and viewpoint of at least one face can be quickly obtained.

In this embodiment, the position of the line-of-sight of at least one face can be output from the neural network, and the processing time is short. In addition, the position of the viewpoint of at least one face can be further calculated. When it is found that the viewpoint of the other person locates on the terminal screen, the above-mentioned alarm can be performed to prevent others from peeking at the user's information.

Figure 4:
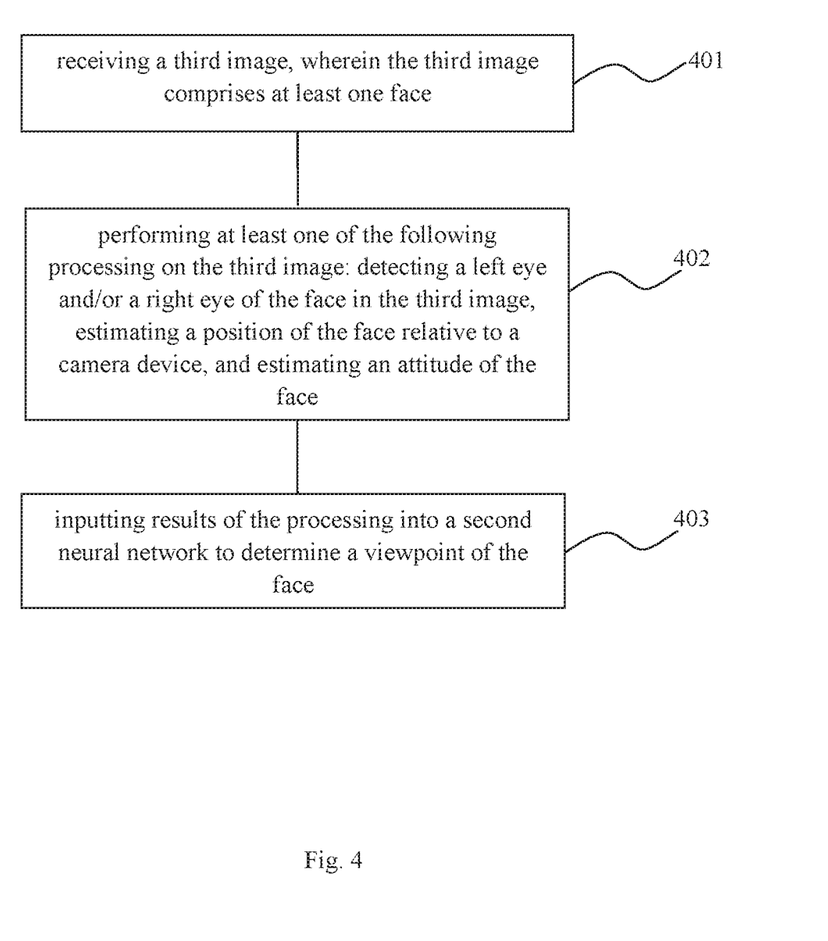
FIG. 4 is a flowchart of a detection method according to Embodiment Two of the present invention.

A detection method provided by Embodiment Two of the present invention will be described in detail below with reference to FIG. 4. As shown in FIG. 4, the method includes the following steps.

Step 401: a third image is received, wherein the third image includes at least a face.

Step 402: at least one of the following processing is performed on the third image: detecting a left eye and/or a right eye of the face in the third image, estimating a position of the face relative to a camera device, and estimating the attitude of the face.

Optionally, the order of execution of the above-described three actions, i.e., detecting the left eye and/or the right eye of the face in the third image, estimating the position of the face relative to the camera device, and estimating the attitude of the face, is not limited, and the three actions may be performed in parallel or in other orders.

Step 403: results of the processing are inputted into a second neural network to determine a viewpoint of the face.

Optionally, detecting the left eye and/or the right eye of the face in the third image includes: determining an image including the left eye and/or the right eye in the third image.

Optionally, estimating the position of the face relative to the camera device includes: detecting feature points of the face according to the third image, determining a circumscribed rectangle including the feature points of the face; and normalizing and binarizing the circumscribed rectangle and the third image into a fourth image. The fourth image can be seen in FIG. 2.

Optionally, estimating the attitude of the face includes: detecting coordinates of the two-dimensional feature points and three-dimensional feature points of the face according to the third image and the face database; estimating the attitude of the face according to the internal parameters of the camera device for shooting the third image, and the two-dimensional feature points and three-dimensional feature points of the face. The camera device can be on the terminal, such as the front camera of a mobile phone. The attitude of the face is represented by a rotation matrix.

Figure 5:
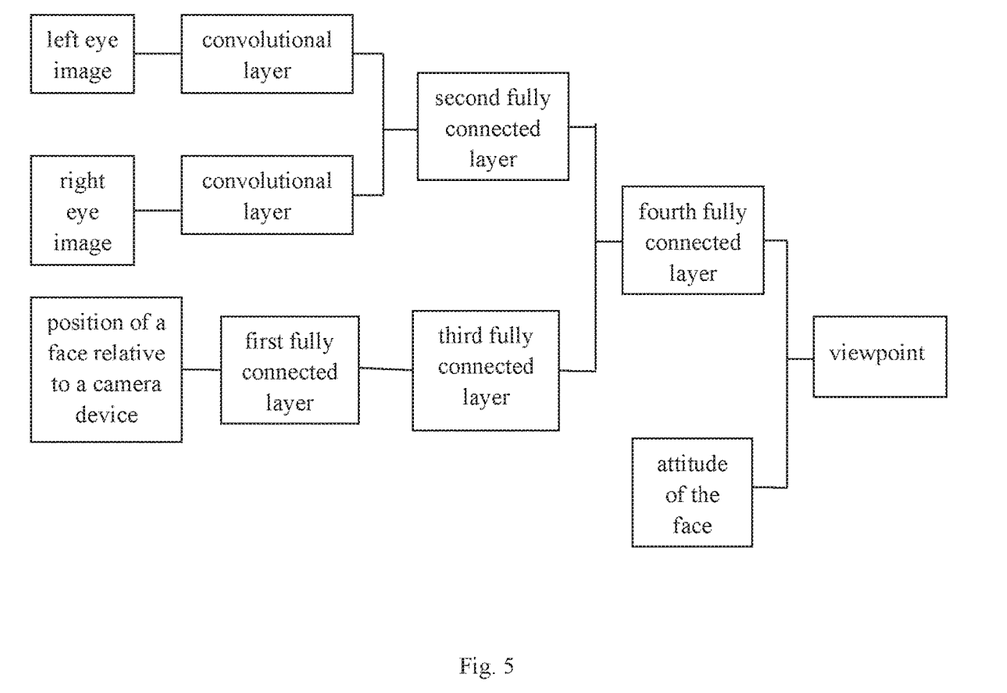
FIG. 5 is a structural diagram of a neural network structure according to Embodiment Two of the present invention.

Optionally, inputting the results of the processing into the second neural network includes at least one of the following: inputting a result of detecting the left eye of the face in the third image into a first convolutional layer of the second neural network, and/or, inputting a result of detecting the right eye of the face in the third image into a second convolutional layer of the second neural network; inputting a result of estimating the position of the face relative to the camera device into a first fully connected layer of the second neural network; inputting a result of estimating the attitude of the face into the second neural network. Outputs of the first convolutional layer and the second convolutional layer are inputs of a second fully connected layer; an output of the first fully connected layer is an input of a third fully connected layer; outputs of the second fully connected layer and the third fully connected layer are inputs of a fourth fully connected layer; the result of estimating the attitude of the face and the output of the fourth fully connected layer are inputs of the results of the viewpoint of the face. Exemplarily, the structure of the second neural network can be seen in FIG. 5.

Optionally, the operation of the terminal is triggered according to the position of the viewpoint of the face relative to the terminal screen. Triggering the operation of the terminal according to the position of the viewpoint of the face relative to the terminal screen includes: determining a viewpoint of a face of someone other than the user located on the terminal screen, and performing a terminal alarm. In this way, the viewpoint of the face of surrounding person is acquired though the camera of the terminal, and when it is found that the viewpoint of other person locates on the terminal screen, the above-mentioned alarm can be performed to prevent others from peeking at the user's information.

For the structure and function of the second neural network in this embodiment, the related description about the first neural network in Embodiment One may be referred to. For the processing of the third image in this embodiment, the related description of the processing of the first image in Embodiment One may be referred to. For a detailed description of each step in this embodiment, the related description in Embodiment One may be referred to.

The above-mentioned second neural network can be pre-trained according to the foregoing structure and function, and stored in the terminal. After the third image is captured by the front camera device, the position of the viewpoint of at least one face can be quickly obtained.

In this embodiment, the position of the viewpoint of at least one face can be outputted from the neural network, and the processing time is short.

Figure 6:
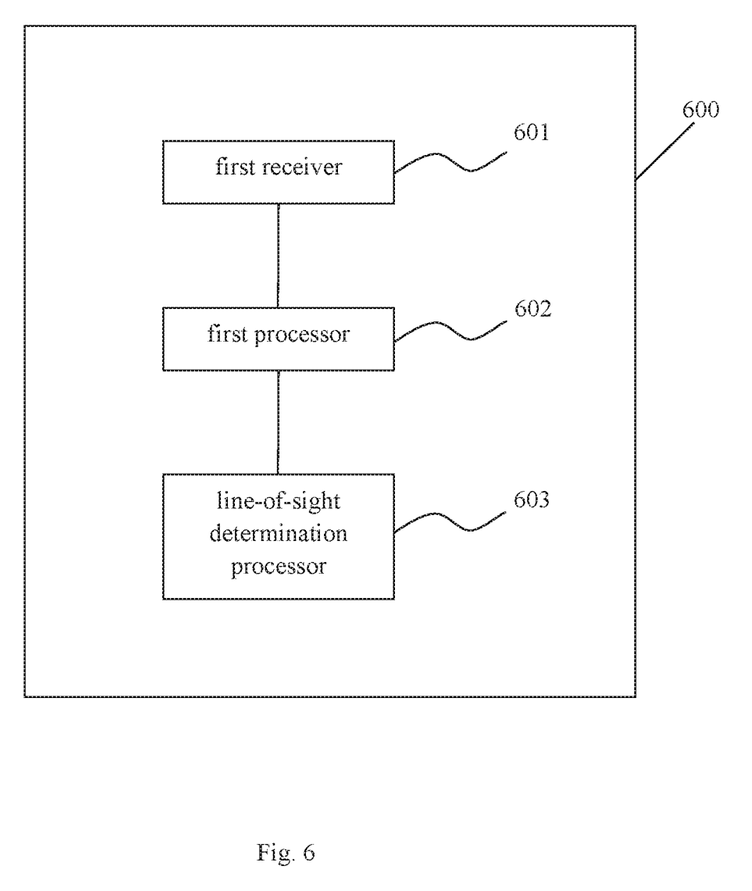
FIG. 6 is a structural diagram of a device for detection according to Embodiment Three of the present invention.

A device 600 for detection provided by Embodiment Three of the present invention will be described in detail below with reference to FIG. 6. As shown in FIG. 6, the device 600 includes:

a first receiver 601 configured to receive a first image, wherein the first image includes at least one face;

The first image may be a color image such as an RGB image or a black-and-white image, and the first image can be captured by a camera of the terminal. The above described receiving the first image using the first receiver 601 may be achieved by receiving from a memory storing the first image, and the memory may be an ROM, an RAM, or a flash memory;

a first processor 602 configured to perform at least one of the following processing on the first image: detecting a left eye and/or a right eye of the face in the first image, estimating a position of the face relative to the camera device, and estimating an attitude of the face;

Optionally, the order of execution of the above-described three actions, i.e., detecting the left eye and/or the right eye of the face in the first image, estimating the position of the face relative to the camera device, and estimating the attitude of the face, is not limited, and the three actions may be performed in parallel or in other orders;

a line-of-sight determination processor 603 configured to input the results of the processing into a first neural network to determine the line-of-sight of the face.

The first processor 602 is further configured to determine a viewpoint of the face according to the line-of-sight of the face, and to trigger an operation of the terminal according to a position of the viewpoint of the face relative to the terminal screen. The first processor is specifically configured to determine that a viewpoint of a face of someone other than the user is located on the terminal screen, and to perform a terminal alarm. Specifically, the foregoing alarm may include popping up of a message box with prompt information, or appearing of a message box with prompt information from one side of the terminal, or an alarm in the form of vibration or sound, etc. Optionally, the above-described triggering the operation of the terminal may further include triggering an application, for example, triggering a camera or video mode of the terminal to start, or triggering a front camera of the terminal to work. In this way, the line-of-sight of the surrounding person is acquired though the camera of the terminal, and when it is found that the line-of-sight of other person locates on the terminal screen, the above-mentioned alarm can be performed to prevent others from peeking at the user's information.

Optionally, the first processor is specifically configured to determine an image including the left eye and/or the right eye in the first image. Optionally, the image including the left eye and/or the right eye may be a small rectangular image including the left eye and/or the right eye described above.

Optionally, the first processor is specifically configured to detect feature points of the face according to the first image, to determine a circumscribed rectangle including the feature points of the face, and to normalize and binarize the circumscribed rectangle and the first image into a second image. Optionally, a location of two-dimensional feature points of the face in the first image can be demarcated by using a face database, such as a 3D Morphable Models (3DMM) database; and the first image including the circumscribed rectangle is normalized to a size of 25×25, and then binarized, such as a face area of 1 (white portion), and the remaining area of 0 (black portion), as shown in FIG. 2. Optionally, the above-described circumscribed rectangle may be an approximately circumscribed rectangle, that is, the edge of the circumscribed rectangle is close to the feature points of the face.

Optionally, the first processor is specifically configured to detect coordinates of the two-dimensional feature points and three-dimensional feature points of the face according to the first image and the face database, to estimate the attitude of the face according to the internal parameters of the camera device for shooting the first image, and the two-dimensional feature points and three-dimensional feature points of the face. The camera device can be on the terminal, such as the front camera of a mobile phone. Specifically, the two-dimensional coordinates and the three-dimensional coordinates of the feature points of the face may be estimated according to the 3DMM database and the first image. The above-described feature points of the face include: feature points of the eye, feature points of the nose, feature points of the mouth, feature points of the eyebrows, etc. The internal parameters of the camera device for shooting the first image can be estimated by the following method:

$$C_x = w/2;$$
$$C_y = h/2;$$
$$f_x = 500 * \left(\frac{w}{640}\right);$$
$$f_y = 500 * \left(\frac{h}{480}\right);$$

wherein, the $C_x$ and the $C_y$ are coordinates of main points, w and h are the width and the height of the first image, respectively, and $f_x$ and $f_y$ are the projections of the focal length in the x-axis direction and in the y-axis direction, respectively. According to the obtained coordinates of the two-dimensional points and the three-dimensional points, the pose of the camera device can be estimated as $M=f(C_x, C_y, f_x, f_y, P_{2D}, P_{3D})$, M=[R, T], wherein, R is a rotation matrix, T is a translation matrix, and the attitude of the face can be represented by the rotation matrix.

The first processor is specifically configured to determine the viewpoint of the face according to the line-of-sight of the face, the position of the left eye and/or the right eye of the face, and the positional relationship between the camera device and the terminal screen. The position of the left eye and/or the right eye of the face includes: a position of a center point of the left eye and/or the right eye of the face, and the position of the center point of the left eye and/or the right eye of the face is calculated from the positions of the points of the corners of the eye of the left eye and/or the right eye of the face. The positions of the points of the corners of the eye are obtained by fitting according to the first image and the face database. The face database can be the above-described 3DMM database.

Specifically, the position of the left eye and/or the right eye of the face may be represented by the position of the obtained feature points of the eye as described above, or may be represented by the center point of the left eye and/or the right eye. The following is the method to obtain the coordinates of the center point:

$$P_{cl} = \frac{R(P_{3D}^{21} + P_{3D}^{27})}{2} + T;$$
$$P_{cr} = \frac{R(P_{3D}^{33} + P_{3D}^{39})}{2} + T;$$

wherein, $P_{3D}^{21}$, $P_{3D}^{27}$, $P_{3D}^{33}$, $P_{3D}^{39}$ are the three-dimensional coordinates of four points of the corners of eyes, $P_{cl}$ is the coordinate of the center point of the left eye, $P_{cr}$ is the coordinate of the center point of the right eye.

The line-of-sight determination processor is specifically configured to: input a result of detecting the left eye of the face in the first image into a first convolutional layer of the first neural network, and/or, input a result of detecting the right eye of the face in the first image into a second convolutional layer of the first neural network; input a result of estimating the position of the face relative to the camera device into a first fully connected layer of the first neural network; input a result of estimating the attitude of the face into the first neural network. The first neural network includes: outputs of the first convolutional layer and the second convolutional layer are inputs of a second fully connected layer; an output of the first fully connected layer is an input of a third fully connected layer; outputs of the second fully connected layer and the third fully connected layer are inputs of a fourth fully connected layer; the result of estimating the attitude of the face and the output of the fourth fully connected layer are inputs of the results of the line-of-sight of the face.

Specifically, FIG. 3 exemplarily shows a structure of a first neural network that can be applied to the present invention. Exemplarily, the dimension of the first fully connected layer is 256, the dimension of the second fully connected layer is 128, the dimension of the third fully connected layer is 128, and the dimension of the fourth fully connected layer is 128. In FIG. 2, the size of the image representing the position of the face relative to the camera device is 25*25. The convolutional layer described above may include three sub-layers having sizes of 5*5/32, 3*3/32 and 3*3/64, respectively.

Through the first neural network described above, the line-of-sights of the left eye and the right eye can be obtained as $V_1$ and $V_2$, respectively, and the coordinates of the fixation points of the eye can be obtained by the following method:

$$P_{sl}=P_{cl}+d_1V_1;$$

$$P_{sr}=P_{cr}+d_2V_2;$$

wherein, $P_{sl}$ is the fixation point of the left eye, $P_{sr}$ is the fixation point of the right eye, $d_1$, $d_2$ are the coefficients.

Therefore, $$\begin{pmatrix} x_{sl} \\ y_{sl} \\ z_{sl} \end{pmatrix} = \begin{pmatrix} x_{cl} \\ y_{cl} \\ z_{cl} \end{pmatrix} + d_1 \begin{pmatrix} x_{v1} \\ y_{v1} \\ z_{v1} \end{pmatrix},$$

wherein, $(x_{sl}, y_{sl}, z_{sl})$ is the coordinate of $P_{sl}$, $(x_{cl}, y_{cl}, z_{cl})$ is the coordinate of $P_{cl}$, $(x_{v1}, y_{v1}, z_{v1})$ is the coordinate of $V_1$.

Optionally, on a tablet and a mobile device, the camera device is on the same plane as the screen, that is, the point on the screen in the camera coordinates is z (depth value)=0, so:

$$z_{sl}=z_{cl}+d_1 z_{v1}$$

$$d_1=z_{cl}/z_{v1};$$

similarly, $$d_2=z_{cr}/z_{v2};$$

so, the fixation point $P_{sc}=(P_{sr}+P_{sl})/2$.

The above-mentioned first neural network can be pre-trained according to the foregoing structure and function, and stored in the terminal. After the first image is captured by the front camera device, the position of the line-of-sight and viewpoint of at least one face can be quickly obtained.

In this embodiment, the position of the line-of-sight of at least one face can be outputted from the neural network, and the processing time is short. In addition, the position of the viewpoint of at least one face can be further calculated, and when it is found that the viewpoint of the other person locates on the screen of the terminal, the above-mentioned alarm can be performed to prevent others from peeking at the user's information.

Figure 7:
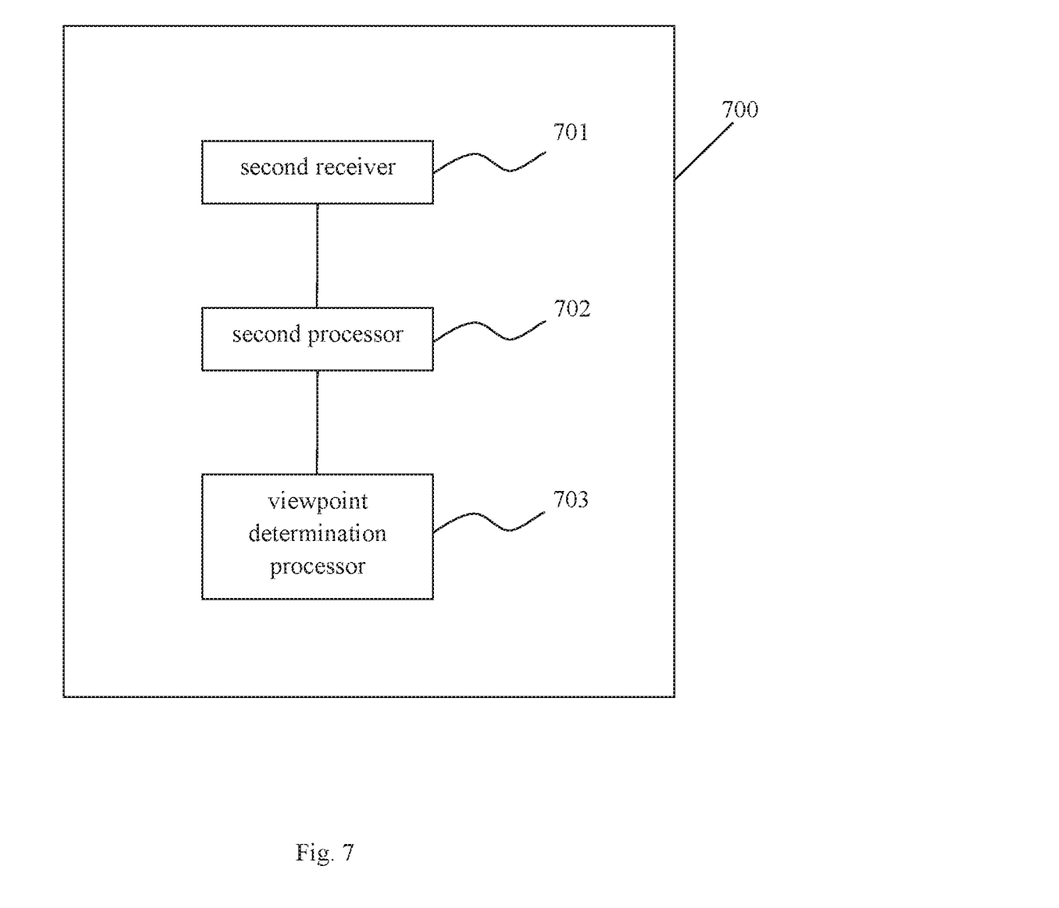
FIG. 7 is a structural diagram of a device for detection according to Embodiment Four of the present invention.

A device 700 for detection provided by Embodiment Four of the present invention will be described in detail below with reference to FIG. 7. As shown in FIG. 7, the device 700 includes:

a second receiver 701 configured to receive a third image, wherein the third image includes at least one face;

a second processor 702 configured to perform at least one of the following processing on the third image: detecting a left eye and/or a right eye of the face in the third image, estimating a position of the face relative to the camera device, and estimating an attitude of the face;

optionally, the order of execution of the above-described three actions, i.e., detecting the left eye and/or the right eye of the face in the third image, estimating the position of the face relative to the camera device, and estimating the attitude of the face, is not limited, and the three actions may be performed in parallel or in other orders;

a viewpoint determination processor 703 configured to input the results of the processing into a second neural network to determine the viewpoint of the face.

Optionally, the second processor is specifically configured to determine an image including the left eye and/or the right eye in the third image.

The second processor is specifically configured to detect feature points of the face according to the third image, to determine a circumscribed rectangle including the feature points of the face, and to normalize and binarize the circumscribed rectangle and the third image into a fourth image.

The fourth image can be seen in FIG. 2.

The second processor is specifically configured to detect coordinates of the two-dimensional feature points and three-dimensional feature points of the face according to the third image and the face database, to estimate the attitude of the face according to the internal parameters of the camera device for shooting the third image, and the two-dimensional feature points and three-dimensional feature points of the face. The camera device can be on the terminal, such as the front camera of a mobile phone. The attitude of the face is represented by a rotation matrix.

Optionally, the viewpoint determination processor is specifically configured to: input a result of detecting the left eye of the face in the third image into a first convolutional layer of the second neural network, and/or, input a result of detecting the right eye of the face in the third image into a second convolutional layer of the second neural network; input a result of estimating the position of the face relative to the camera device into a first fully connected layer of the second neural network; input a result of estimating the attitude of the face into the second neural network.

Optionally, the second neural network includes: outputs of the first convolutional layer and the second convolutional layer are inputs of a second fully connected layer; an output of the first fully connected layer is an input of a third fully connected layer; outputs of the second fully connected layer and the third fully connected layer are inputs of a fourth fully connected layer; the result of estimating the attitude of the face and the output of the fourth fully connected layer are inputs of the results of the viewpoint of the face. Exemplarily, the structure of the second neural network can be seen in FIG. 5.

The second processor is further configured to trigger an operation of the terminal according to a position of the viewpoint of the face relative to the terminal screen. The second processor is specifically configured to determine that a viewpoint of a face of someone other than the user is located on the terminal screen, and to perform a terminal alarm. In this way, the viewpoint of the surrounding person is acquired though the camera of the terminal, and when it is found that the viewpoint of other person locates on the terminal screen, the above-mentioned alarm can be performed to prevent others from peeking at the user's information.

For the structure and function of the second neural network in this embodiment, the related description about the first neural network in Embodiment One or Embodiment Three may be referred to. For the processing of the third image in this embodiment, the related description of the processing of the first image in Embodiment One or Embodiment Three may be referred to. For a detailed description of the device in this embodiment, the related description in Embodiment One or Embodiment Three may be referred to.

The above-mentioned second neural network can be pre-trained according to the foregoing structure and function, and stored in the terminal. After the third image is captured by the front camera device, the position of the viewpoint of at least one face can be quickly obtained.

In this embodiment, the position of the viewpoint of at least one face can be outputted from the neural network, and the processing time is short.

Figure 8:
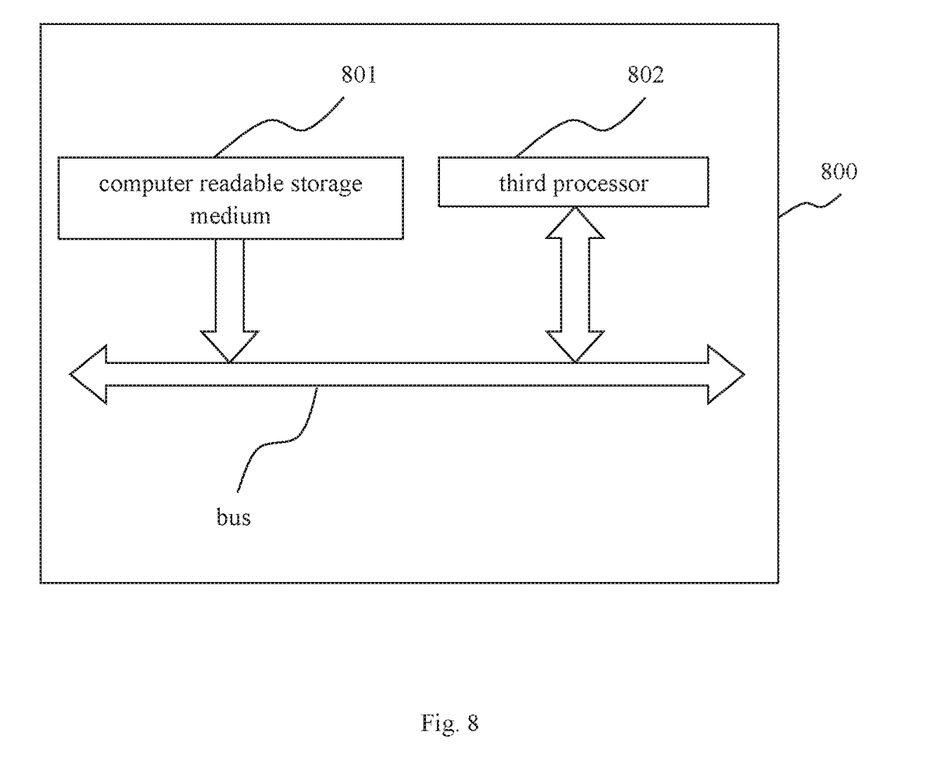
FIG. 8 is a structural diagram of a device for detection according to Embodiment Five of the present invention.

A device 800 for detection provided by Embodiment Five of the present invention will be described in detail below with reference to FIG. 7, the device 800 includes a computer readable storage medium 801, wherein the computer readable storage medium 801 stores a computer program; when executed by a third processor 802, the computer program implements the steps of the methods in Embodiment One or Embodiment Two. As shown in FIG. 8, optionally, the device 800 may include a bus.

In this embodiment, the position of the viewpoint or the line-of-sight of at least one face can be directly outputted from the neural network, and the processing time is short. The viewpoint of the surrounding person is acquired though the camera of the terminal, and when it is found that the viewpoint of other person locates on the terminal screen, the above-mentioned alarm can be performed to prevent others from peeking at the user's information.

Figure 9:
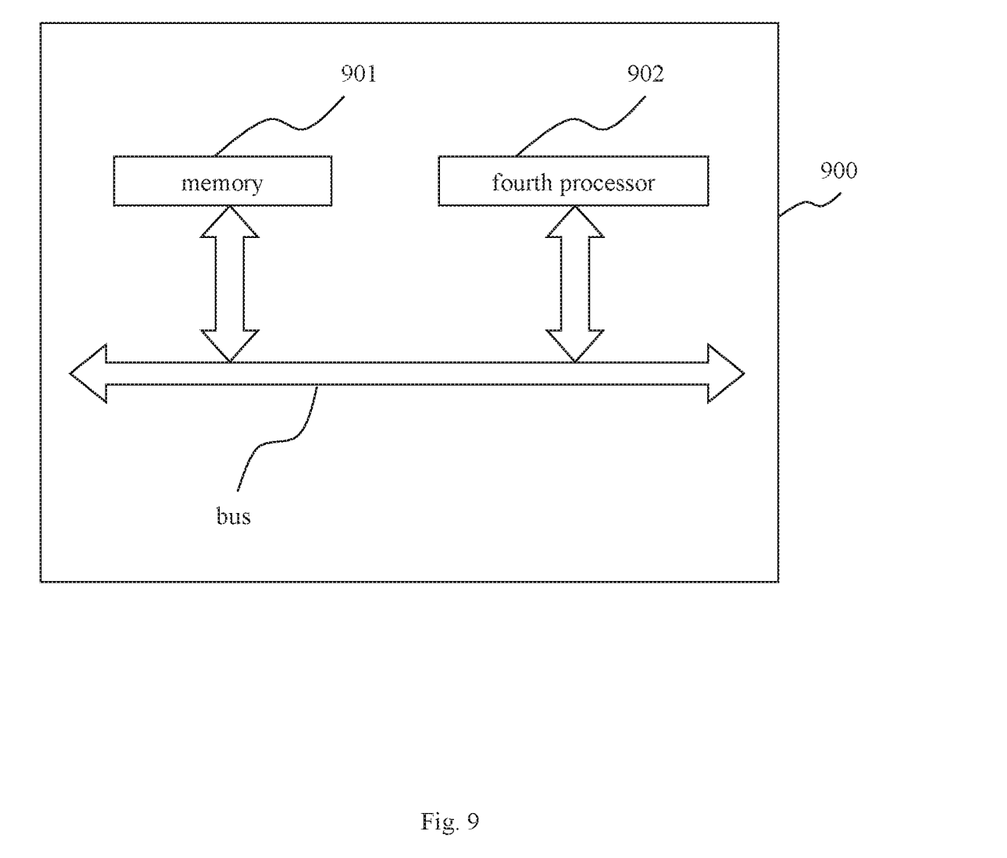
FIG. 9 is a structural diagram of a device for detection according to Embodiment Six of the present invention.

A device 900 for detection provided by Embodiment Six of the present invention will be described in detail below with reference to FIG. 9, the device 900 includes a memory 901, a fourth processor 902, and a computer program stored in the memory 901 and operable on the fourth processor 902; when executed by the fourth processor 902, the computer program implements the steps of the methods in Embodiment One or Embodiment Two. Optionally, as shown in the figure, the device 900 further includes a bus.

In this embodiment, the position of the viewpoint or the line-of-sight of at least one face can be directly output from the neural network, and the processing time is short. The viewpoint of the surrounding person is acquired though the camera of the terminal, and when it is found that the viewpoint of other person locates on the terminal screen, the above-mentioned alarm can be performed to prevent others from peeking at the user's information.

Exemplarily, the computer program can be partitioned into one or more modules/units that are stored in the memory and executed by the processor to perform the present invention. The one or more modules/units can be a series of computer program instruction segments capable of performing a specific function, and the instruction segments are used to describe the executing processes of the computer program in the device/terminal device.

The device/terminal device can be a computing device such as a mobile phone, a tablet computer, a desktop computer, a laptop, a palmtop computer, and a cloud server. The device/terminal device can include, but is not limited to, a processor, a memory. It will be understood by those skilled in the art that the schematic diagram of the present invention is merely an example of a device/terminal device, does not constitute a limit on the device/terminal device. The device/terminal device can include more or fewer components than shown in the figures, or a combination of some components, or different components. For example, the device/terminal device can also include input and output devices, network access devices, buses, etc.

The above-described processor can be a central processing unit (CPU), or can be other general-purpose processor, a digital signal processor (DSP), an application specific integrated circuit (ASIC), or a Field-Programmable Gate Array (FPGA) or other programmable logic device, discrete gate or transistor logic device, discrete hardware components, etc. The general-purpose processor can be a microprocessor, or any conventional processor etc. The processor is a control center of the device/terminal device, which connects various parts of the entire device/terminal device using various interfaces and lines.

The memory can be used to store the computer programs and/or modules. The processor implements various functions of the device/terminal device by operating or executing computer programs and/or modules stored in the memory, as well as calling data stored in the memory. The memory can include a program storage area and a data storage area, wherein the program storage area can store an operating system, an application program required by at least one function (such as an image playing function, etc.), etc.; the data storage area can store data (such as video data, images, etc.) created according to the use of the mobile phone. In addition, the memory can include a high-speed random-access memory, and can also include a non-volatile memory, such as a hard disk, an internal memory, a plug-in hard disk, a smart media card (SMC), a secure digital (SD) card, a flash card, and at least one disk storage device, flash memory device, or other volatile solid memory devices.

The module/unit integrated by the device/terminal device can be stored in a computer readable storage medium if it is implemented in the form of a software functional unit and sold or used as a standalone product. Based on such understanding, all or part of the processes in the methods of the above-described embodiments implemented by the present invention can also be achieved by a computer program instructing related hardware. The computer program can be stored in a computer readable storage medium. When executed by the processor, the computer program implements the steps of the various methods of the above-described embodiments. Wherein, the computer program includes computer program code, which can be in the form of source code, object code, executable file, or some intermediate, etc. The computer readable storage medium can include: any entity or device capable of carrying the computer program code, a recording medium, a USB flash drive, a mobile hard disk, a magnetic disk, an optical disk, a computer memory, a read-only memory (ROM), a random-access memory (RAM), an electrical carrier signal, a telecommunication signal, and a software distribution medium.

The imaging of the target object in the above-described embodiments can be a local imaging or an integral imaging. The method or device provided by the present invention is applicable to either local imaging or integral imaging, or the local imaging or integral imaging after a related adjustment. The adjustment mentioned above does not require creative work by ordinary technicians in the art and should fall within the protective scope of the present invention.

What is claimed is:

1. A detection method, comprising:
receiving a first image, wherein the first image comprises at least one face;
performing the following processing on the first image:
detecting a left eye and/or a right eye of the face in the first image, estimating a position of the face relative to a camera device, estimating an attitude of the face; and
inputting results of the processing into a first neural network to determine a line-of-sight of the face;
wherein determining the line-of-sight of the face requires determining a line of sight of the left eye $V_1$ and a line of sight of the right eye $V_2$ using the following equations:

$$P_{sl}=P_{cl}+d_1V_1;$$

$$P_{sr}=P_{cr}+d_2V_2;$$

wherein $P_{sl}$ is a fixation point of the left eye, $P_{sr}$ is a fixation point of the right eye, $P_{cl}$ is a center point of the left eye, $P_{cr}$ is a center point of the right eye, $d_1$ and $d_2$ are coefficients.

2. The detection method according to claim 1, further comprising:
determining a viewpoint of the face according to the line-of-sight of the face; and
triggering an operation of a terminal according to a position of the viewpoint of the face relative to a terminal screen.

3. The detection method according to claim 2, wherein triggering the operation of the terminal according to the position of the viewpoint of the face relative to the terminal screen comprises:
determining that a viewpoint of a face of someone other than a user locates on the terminal screen, and performing a terminal alarm in response to the locating of the viewpoint of a face of someone other than a user on the terminal screen.

4. The detection method according to claim 2, wherein determining the viewpoint of the face according to the line-of-sight of the face comprises:
determining the viewpoint of the face according to the line-of-sight of the face, a position of the left eye and/or the right eye of the face, and a positional relationship between the camera device and the terminal screen.

5. The detection method according to claim 4, wherein the position of the left eye and/or the right eye of the face comprises:
a position of a center point of the left eye and/or the right eye of the face, and wherein the position of the center point of the left eye and/or the right eye of the face is calculated from positions of points of corners of the eye of the left eye and/or the right eye of the face.

6. The detection method according to claim 5, wherein the positions of the points of the corners of the eye are obtained by fitting according to the first image and a face database.

7. The detection method according to claim 1, wherein detecting the left eye and/or the right eye of the face in the first image comprises:
determining an image including the left eye and/or the right eye in the first image.

8. The detection method according to claim 1, wherein estimating the position of the face relative to the camera device comprises:
detecting feature points of the face according to the first image, determining a circumscribed rectangle including the feature points of the face; and
normalizing and binarizing the circumscribed rectangle and the first image into a second image.

9. The detection method according to claim 1, wherein estimating the attitude of the face comprises:
detecting coordinates of two-dimensional feature points and three-dimensional feature points of the face according to the first image and a face database; and
estimating the attitude of the face according to internal parameters of the camera device for shooting the first image, and the two-dimensional feature points and the three-dimensional feature points of the face.

10. The detection method according to claim 9, wherein the attitude of the face is represented by a rotation matrix.

11. The detection method according to claim 1, wherein inputting the results of the processing into the first neural network comprises at least one of the following steps:
inputting a result of detecting the left eye of the face in the first image into a first convolutional layer of the first neural network, and/or, inputting a result of detecting the right eye of the face in the first image into a second convolutional layer of the first neural network;
inputting a result of estimating the position of the face relative to the camera device into a first fully connected layer of the first neural network; and
inputting a result of estimating the attitude of the face into the first neural network.

12. The detection method according to claim 11, wherein in the first neural network:
outputs of the first convolutional layer and the second convolutional layer are inputs of a second fully connected layer;
an output of the first fully connected layer is an input of a third fully connected layer;
outputs of the second fully connected layer and the third fully connected layer are inputs of a fourth fully connected layer; and
the result of estimating the attitude of the face and an output of the fourth fully connected layer are inputs of results of the line-of-sight of the face.

13. A detection device, comprising:
a first receiver configured to receive a first image, wherein the first image comprises at least one face;
a first processor configured to perform the following processing on the first image:
detecting a left eye and/or a right eye of the face in the first image, estimating a position of the face relative to a camera device, estimating an attitude of the face; and
a line-of-sight determination processor configured to input results of the processing into a first neural network to determine a line-of-sight of the face;
wherein determining the line-of-sight of the face requires determining a line of sight of the left eye $V_1$ and a line of sight of the right eye $V_2$ using the following equations:

$$P_{sl}=P_{cl}+d_1V_1;$$

$$P_{sr}=P_{cr}+d_2V_2;$$

wherein $P_{sl}$ is a fixation point of the left eye, $P_{sr}$ is a fixation point of the right eye, $P_{cl}$ is a center point of the left eye, $P_{cr}$ is a center point of the right eye, $d_1$ and $d_2$ are coefficients.

14. The detection device according to claim 13, wherein the first processor is further configured to determine a viewpoint of the face according to the line-of-sight of the face, and to trigger an operation of a terminal according to a position of the viewpoint of the face relative to a terminal screen.

15. The detection device according to claim 14, wherein the first processor is specifically configured to determine that a viewpoint of a face of someone other than a user is located on the terminal screen, and to perform a terminal alarm in response to the locating of the viewpoint of a face of someone other than a user on the terminal screen.

16. The detection device according to claim 14, wherein the first processor is specifically configured to determine the viewpoint of the face according to the line-of-sight of the face, a position of the left eye and/or the right eye of the face, and a positional relationship between the camera device and the terminal screen.

17. The detection device according to claim 16, wherein the position of the left eye and/or the right eye of the face comprises:
a position of a center point of the left eye and/or the right eye of the face, and wherein the position of the center point of the left eye and/or the right eye of the face is calculated from positions of points of corners of the eye of the left eye and/or the right eye of the face.

18. The detection device according to claim 17, wherein the positions of the points of the corners of the eye are obtained by fitting according to the first image and a face database.

19. The detection device according to claim 13, wherein the first processor is specifically configured to determine an image including the left eye and/or the right eye in the first image.

20. The detection device according to claim 13, wherein the first processor is specifically configured to detect feature points of the face according to the first image, to determine a circumscribed rectangle including the feature points of the face; and to normalize and binarize the circumscribed rectangle and the first image into a second image.

21. The detection device according to claim 13, wherein the first processor is specifically configured to detect coordinates of two-dimensional feature points and three-dimensional feature points of the face according to the first image and the face database, to estimate the attitude of the face according to internal parameters of the camera device for shooting the first image, and the two-dimensional feature points and the three-dimensional feature points of the face.

22. The detection device according to claim 21, wherein the attitude of the face is represented by a rotation matrix.

23. The detection device according to claim 13, wherein the line-of-sight determination processor is specifically configured to:
  input a result of detecting the left eye of the face in the first image into a first convolutional layer of the first neural network, and/or, inputting a result of detecting the right eye of the face in the first image into a second convolutional layer of the first neural network;
  input a result of estimating the position of the face relative to the camera device into a first fully connected layer of the first neural network; and
  input a result of estimating the attitude of the face into the first neural network.

24. The detection device according to claim 23, wherein in the first neural network:
  outputs of the first convolutional layer and the second convolutional layer are inputs of a second fully connected layer;
  an output of the first fully connected layer is an input of a third fully connected layer;
  outputs of the second fully connected layer and the third fully connected layer are inputs of a fourth fully connected layer; and
  the result of estimating the attitude of the face and an output of the fourth fully connected layer are inputs of results of the line-of-sight of the face.

* * * * *